US005663819A

United States Patent [19]

Lewis

[11] Patent Number: 5,663,819

[45] Date of Patent: Sep. 2, 1997

[54] OPTO-COUPLER BASED SECURE COMPUTER COMMUNICATIONS INTERFACE

[75] Inventor: Stephen P. Lewis, Joppatowne, Md.

[73] Assignee: Emanon, Inc., Vero Beach, Fla.

[21] Appl. No.: 531,785

[22] Filed: May 21, 1995

[51] Int. Cl.⁶ .............................. H04B 10/20; H04J 14/00
[52] U.S. Cl. .......................... 359/118; 359/127; 385/24; 380/94; 370/419; 379/93.02
[58] Field of Search ..................... 359/118, 127, 359/125, 137, 128, 129; 370/13–14, 17; 380/4, 54; 385/16, 24; 340/825.06; 364/713

[56] References Cited

U.S. PATENT DOCUMENTS 4,748,689 5/1988 Mohr ........................................ 359/118

Primary Examiner—Kinfe-Michael Negash
Attorney, Agent, or Firm—Charles E. Wands

[57] ABSTRACT

An opto-coupler interface provides secure control over the ability of a remote network (Internet) user to access a local user workstation. The interface is installed as an auxiliary unit between the external network and the local user's workstation connection to its associated local area network. Once installed, the opto-coupler based connectivity interface allows a computer end user to selectively provide a communication path between the end user's workstation and an external data communication network, only during the time that the user wishes to be connected to the network. In the absence of this switched connection, the opto-coupler is turned off, thereby securely severing the external access communication link and thereby preventing external data communication network access to either the end user or a local network with which the end user's workstation is normally connected.

15 Claims, 3 Drawing Sheets

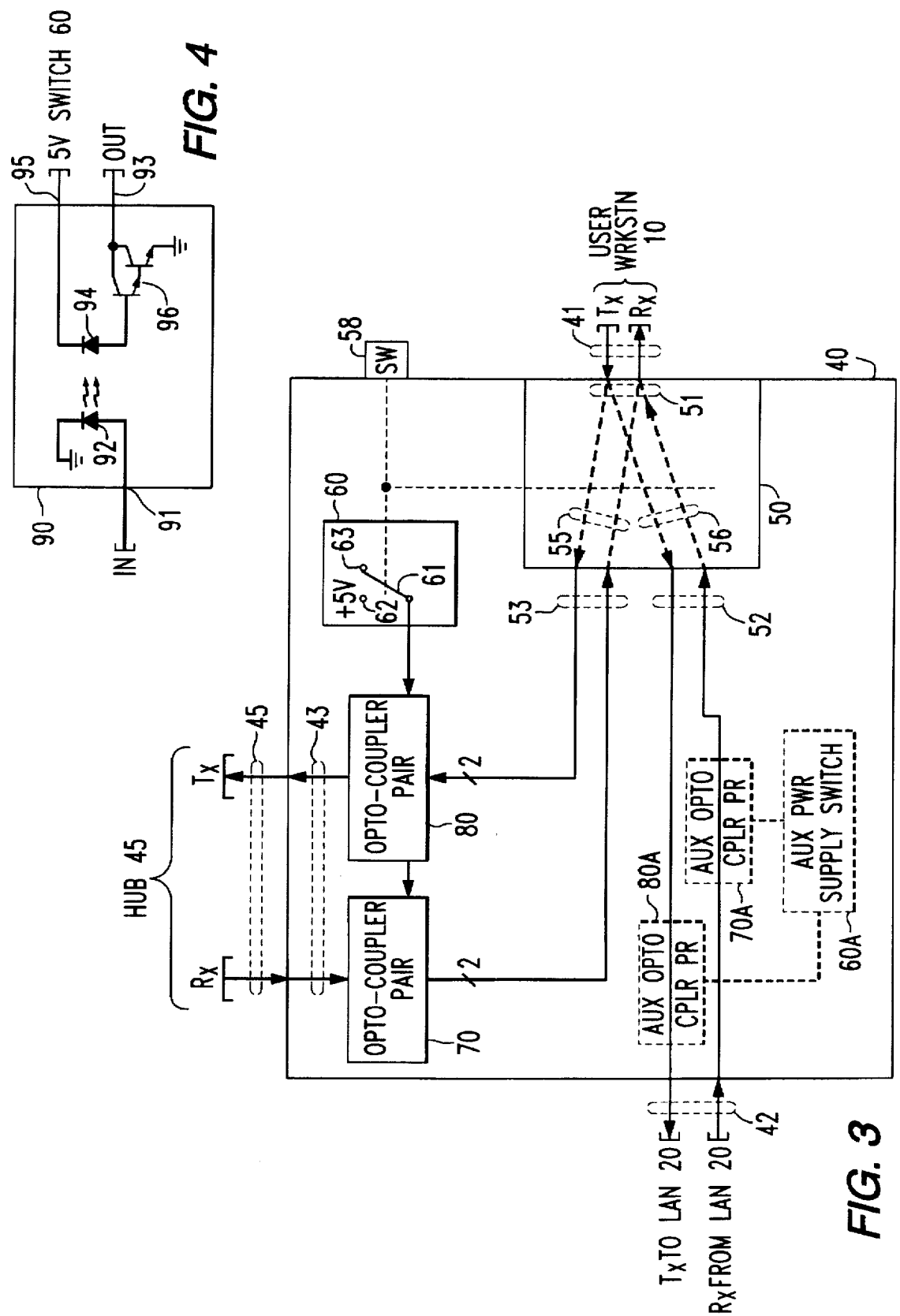

OPTO-COUPLER BASED SECURE COMPUTER COMMUNICATIONS INTERFACE

FIELD OF THE INVENTION

The present invention relates in general to data processing systems, and is particularly directed to an opto-coupler based computer connectivity interface for enabling a computer end user to selectively provide a communication path between the end user's workstation and an external data communication network, such as the Internet, only during such time that the user chooses, but otherwise securely blocking access from the external data communication network to each of the end user and a local network with which the end user is normally connected.

BACKGROUND OF THE INVENTION

The Internet and the World Wide Web (WWW), sometimes referred to as the superinformation highway, provide data processing system users with a global communication link to a continually increasing number of databases and other network users. The local link between the network and the user is typically by way of a phone line, with the workstation hardware including a modem that allows dial-up access between the user and a remote party. Since the workstation is coupled directly to a phone line, not only can the workstation access any other party having similar network access, but any other party can call the workstation.

More particularly, as diagrammatically illustrated in FIG. 1, a user workstation 10 is typically coupled via a communication link 11 to a local area network (LAN) 20 by way of a local area network interface 13. The interface 13 also serves to provide access to an external network 30. The local area network 20 customarily includes one or more computer-based units, such as the illustrated workstations 21 and 22, network server 23 and printer 24, which are interconnected via a hub 25. Hub 25 is connected to interface 13, so that the end user workstation 10 may access any unit of the local area network 20. Similarly, to connect to the external area 30 network (e.g. Internet) interface 13 is coupled through an electronic mail gateway 32 and a modem 33, so that a dial-up connection may be provided to an Internet connection provider 34, through which direct access to the Internet 35 is achieved.

Because the telephone network is a potential window into any computer linked to it, it is customary to both wrap or embed all communications in a 'security blanket' (some form of encryption) at the source end, and to employ one or more permission code (password) layers that must be used to gain access to another (destination) computer. Unfortunately, the integration of multiple and diverse application programs to meet user demands for flexibility and versatility in workstation functionality constitutes an impairment to the use of such embedded security measures, either within the data communication mechanism or at the point of program execution.

SUMMARY OF THE INVENTION

In accordance with the present invention, rather than address the external access security issue from an encryption standpoint or as part of an application program being run by the user, control of the ability of a remote network party to access (via the Internet) a local user workstation is effected by installing an opto-coupler based connectivity interface between the external network and the local user's workstation connection to its associated local area network. Once installed, the opto-coupler based connectivity interface permits a computer end user to selectively switch in a communication path between the end user's workstation and an external data communication network, such as the Internet, only during the time that the user wishes to be connected to the network. In the absence of this switched connection, the opto-coupler is turned off, thereby securely severing the external access communication link and thereby preventing external data communication network access to either the end user or a local network with which the end user is normally connected.

As will be described, the opto-coupler interface has three bidirectional communication ports, a first of which is coupled to the end user's workstation, a second of which is coupled to the local area network interface, and a third of which is coupled to a hub through which access to an electronic mail gateway for the external network is afforded. The opto-coupler interface has a default condition that provides a direct, hard-wired bidirectional communication path between the first and second ports, so that the end user's workstation is connected to the LAN. During this default mode of operation, the light beam response path through the interface is effectively interrupted, so as to prevent the possibility of an external network user from gaining access to the communication path.

When the end user desires to be connected to the external network, the opto-coupler interface is operative to provide an optically coupled bidirectional communication path between its first and third ports, thereby simultaneously connecting the end user's workstation to the external hub connection link, and interrupting the path between the first and second ports. The opto-coupler circuitry within interface is enabled (powered-up) only when the end user places interface in the external network connection mode. In the default mode, no power is supplied to the opto-electronic components of its internal circuitry, preventing it from responding to electro-optic output signals generated by incoming digital signals from the external network.

The opto-coupler interface is configured of a first electrical connectivity switch having an end user transmit/receive port 51, a local area network transmit/receive port and an opto-coupler transmit/receive port, each connected to a two-wire twisted pair associated with a respective transmit or receive communication path. The first switch has ganged switch arm pairs, which provide electrical connections between either the end user transmit/receive port and the local area network transmit/receive port 52, or between the end user transmit/receive port and the opto-coupler transmit/receive port, depending upon the mode of operation.

A further power supply switch is ganged to the first switch, and is coupled between an opto-coupler switch power supply terminal and each of a transmit opto-coupler switch pair and a receive opto-coupler switch pair. A respective opto-coupler switch is preferably comprised of a commercially available solid state opto-coupler chip, having a light emitting diode and an associated photodiode circuit. In the default mode, the opto-coupler power supply switch is coupled to an open terminal, so that each opto-coupler switch pair is inoperative. In the external network connection mode, the opto-coupler power supply switch is coupled to the power supply terminal, so that each opto-coupler switch pair is powered-up and therefore able to provide a bidirectional electro-optic, opto-electronic connections between the first and third ports of the interface.

A significant advantage of using opto-coupler components is the fact that, when not powered-up (default mode), then regardless of incoming signals from an external network, since the opto-coupler configuration is turned off, the disabled photodiodes in each opto-coupler switch pair effectively sever the communication path between the opto-coupler's input and output terminals, so as to prevent the possibility of signal leakage therebetween, thus maintaining a secure intra-office link between the end user's workstation and the local area network.

BRIEF DESCRIPTION OF THE DRAWINGS

FIG. 3 diagrammatically shows the internal configuration of an opto-coupler interface; and FIG. 4 diagrammatically illustrates the configuration of an opto-coupler unit used in the opto-coupler interface of FIG. 3.

DETAILED DESCRIPTION

Figure 1:
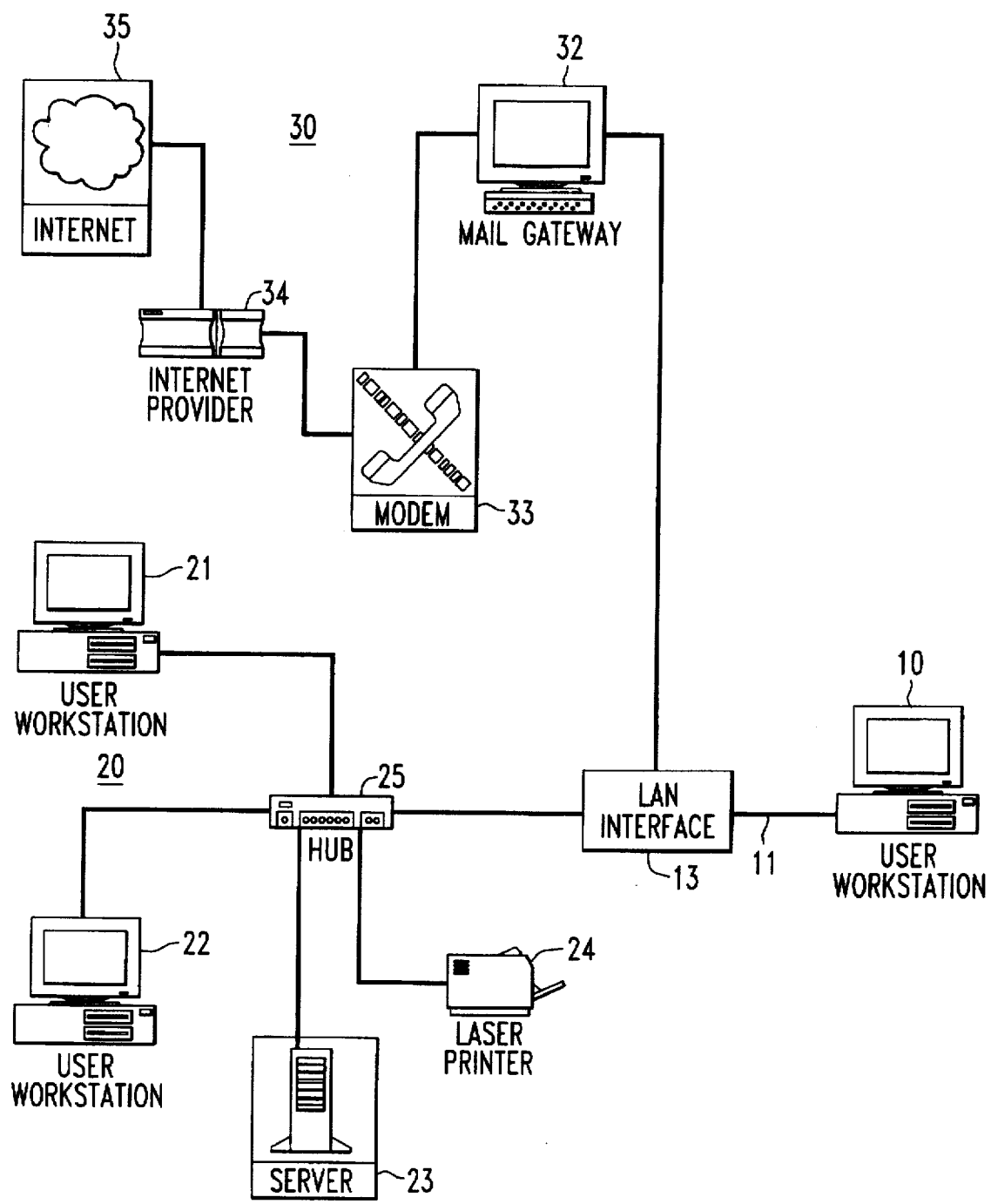
FIG. 1 diagrammatically illustrates a user workstation coupled to a local area network by way of a local area network interface, which also provides access to an external network.

Before describing in detail the improved opto-coupler based computer connectivity security interface of the present invention, it should be observed that the invention resides primarily in what is effectively a prescribed set of conventional telecommunication signalling hardware components and an associated control mechanism therefor. Consequently, the configuration of such components and the manner in which they are operated to be interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood.

Figure 2:
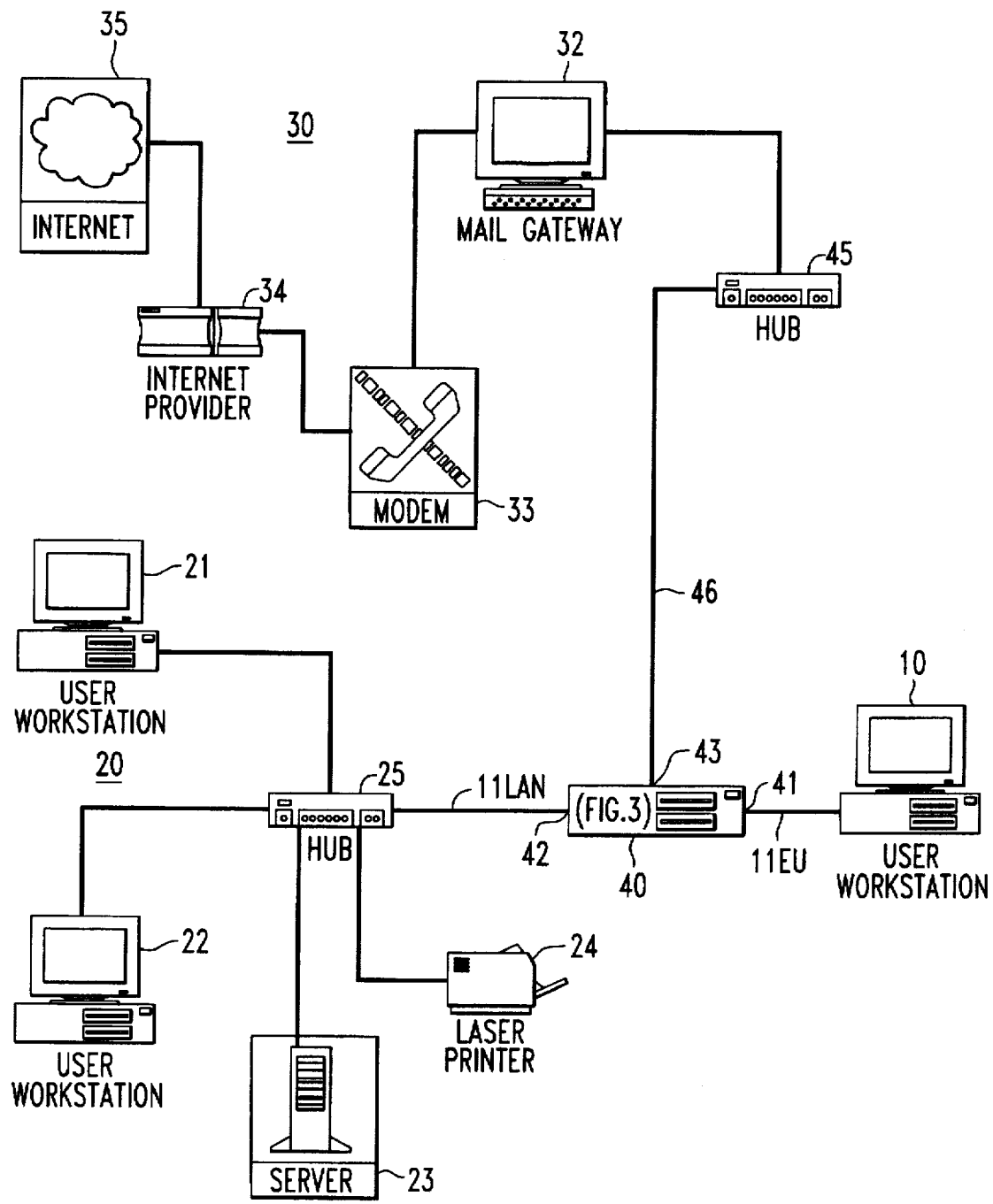
FIG. 2 diagrammatically illustrates the manner in which the network arrangement of FIG. 1 may be modified to include the opto-coupler based security interface of the present invention.

As pointed out briefly above, the opto-coupler based workstation connectivity interface of the present invention is installed as an auxiliary data path interface, and is operative to augment the conventional local area network interface provided between the external network and the local user's workstation connection to its associated local area network. For purposes of providing a non-limiting illustrative example, FIG. 2 diagrammatically illustrates the manner in which a conventional network arrangement, in particular that shown in the above-referenced FIG. 1, may be modified to include the opto-coupler based security interface of the present invention.

As shown therein, an opto-coupler interface 40, shown in detail in FIG. 3, to be described, is installed in the communication path 11 between the end user workstation 10 and the interface 13 to the local area network 20. Interface 40 has three bidirectional communication ports: 41, 42 and 43. The first port—port 41—is coupled via a bidirectional communication path segment 11EU to the end user's workstation 10; the second port—port 42—is coupled via a bidirectional communication path segment 11LAN to the local area network interface 13. The third interface port—port 43—is coupled via link 45 to a hub 46 through which access to the electronic mail gateway 32 is provided.

The default condition of opto-coupler interface 40 provides a direct, hard-wired bidirectional communication path therethrough between ports 41 and 42, so that the end user's workstation 10 is normally connected to LAN 20. As will be described with reference to FIG. 3, during this default mode of operation, the configuration of interface 40 prevents any possibility of an external network user from gaining access to the communication path 11, so that the security of neither workstation 10 nor that of LAN 20 can be compromised.

When the end user desires to be connected to the external network, opto-coupler interface 40 is placed in its external network connection mode, so as to provide an optically coupled bidirectional communication path therethrough between ports 41 and 43, thereby connecting the end user's workstation 10 to external hub connection link 45, and interrupting the path between ports 41 and 42. The opto-coupler circuitry within interface 40 is configured such that it only becomes enabled when the end user places interface 40 in the external connection mode. In the default mode, no power is supplied to the opto-electronic components of its internal circuitry, so that is incapable of responding to electro-optic output signals generated by incoming digital signals from hub 46 on link 45. This powering down of its opto-electronic components in the default mode maintains the opto-coupler interface turned-off, and fully isolates link 45 from link 11.

Referring now to FIG. 3 the internal configuration of opto-coupler interface 40 is shown in detail as comprising a first electrical connectivity switch 50, having an end user transmit/receive port 51, an LAN transmit/receive port 52 and an opto-coupler transmit/receive port 53. Each transmit and receive portion of each port may be connected to a two-wire twisted pair associated with a respective transmit or receive communication path. Internally, switch 50 has ganged switch arm pairs 55 and 56, which provide electrical connections between end user transmit/receive port 51 and LAN transmit/receive port 52, or between end user transmit/receive port 51 and opto-coupler transmit/receive port, depending upon the operation of an associated panel switch 58.

Also ganged to switch arms 55 and 56 of switch 50 is a further switch arm 61 of a (5 volt) power supply switch 60, which is coupled in circuit between a five volt opto-coupler switch power supply terminal 62 and each of a transmit opto-coupler switch pair 70 and a receive opto-coupler switch pair 80. In its normal default mode, with panel switch 58 connecting ganged switch arms 55 and 56 of switch 50 between its ports 51 and 52, the switch arm 61 of opto-coupler power supply switch 60 is coupled to open terminal 63, so that each opto-coupler pair 70 and 80 is powered down and therefore inoperative. However, when panel switch 58 is thrown to its opposite position connecting ganged switch arms 55 and 56 of switch 50 between ports 51 and 53, the switch arm 61 of opto-coupler power supply switch 60 is coupled to power supply terminal 62, so that each opto-coupler pair 70 and 80 is energized and therefore able to provide a bidirectional electro-optic, opto-electronic connection therethrough between port 53 of switch 50 and port 43 of interface 40.

FIG. 4 diagrammatically illustrates the configuration of a respective opto-coupler unit 90, two of which are installed in each opto-coupler pair 70 and 80, in association with the two respective wires of the twisted pair being interfaced.

Each opto-coupler unit 90 is preferably a commercially available solid state opto-coupler chip, and comprises an electro-optic input element, shown as a light emitting diode (LED) 92 coupled between an input terminal 91 and ground. In response to a digitally modulated voltage applied to input terminal 91, LED 91 generates a correspondingly modulated light beam which impinges upon an opto-electronic element, shown as a photodiode 94. Photodiode 94 is coupled in circuit between power supply terminal 95 and an output transistor driver pair 96, which is coupled to output terminal 93 (to which a current-to-voltage translating load resistor not shown is coupled). When powered-up by the switched five volt supply voltage applied from switch 60 to power supply terminal 95, then, in response to receiving the digitally modulated light beam, photodiode 94 generates an output current which is amplified by output transistor driver pair 96 and provided as an output signal at output terminal 93. coupled).

However, in the absence of being powered-up, as is the case when switch 60 is placed in its default mode, then, regardless of the impingement of a digitally modulated light beam thereon, photodiode 94 will not respond, so that no output signal will be provided at output terminal 93. Thus, the opto-coupler configuration is either turned on, or it is turned off. When off, the disabled photodiode 94 effectively severs the communication path between input terminal 91 and output terminal 93, so as to prevent the possibility of signal leakage therebetween.

This is in contrast with the use of a metallic electrical switch, where wear and tear or hang-up of moving mechanical parts may place terminal leads sufficiently close to one another to either allow an arc between adjacent links, and thereby close the circuit, or allow one 'open' terminal to act as a radiating antenna, the modulated radiated field from which is picked up by another terminal of the switch that is connected to the external network. This eventuality might allow a very skilled usurper to employ sophisticated, low signal-to-noise ratio signal processing techniques to monitor intra-office communications between the end user's workstation 10 and the local area network 20. Since the opto-coupler interface of the present invention severs the electrical link, this unwanted possibility is avoided.

As will be appreciated from the foregoing description, the opto-coupler interface of the present invention, rather than address the above-described external network access security issue from an encryption standpoint or as part of an application program being run by the user, secure control over the ability of a remote network party to access (via the Internet) a local user workstation is effected by means of an opto-coupler based connectivity interface that is installed as an auxiliary unit between the external network and the local user's workstation connection to its associated local area network. Once installed, the opto-coupler based connectivity interface allows a computer end user to selectively provide a communication path between the end user's workstation and an external data communication network, only during the time that the user wishes to be connected to the network. In the absence of this switched connection, the opto-coupler is turned off, thereby securely severing the external access communication link and thereby preventing external data communication network access to either the end user or a local network with which the end user's workstation is normally connected.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

For example, for further enhanced security, an additional set of opto-coupler unit pairs (shown in FIG. 4, in broken lines 70A and 80A) and associated power-coupling switch (shown in broken lines 60A) may be installed in the communication path between ports 52 and 53 of controlled switch 50 and port 42 of interface 40. With this additional opto-coupler circuit installation, the additional associated power-coupling switch 60A may be connected with panel switch 58, such that, when the opto-coupler units pairs 70 and 80 are powered-up, the additional set 70A and 80A is powered down, and vice versa. In this alternative implementation, the controlled switch 50 may be dispensed with, such that two (70A and 80A) of the four pairs of opto-coupler units are connected between port 41 and port 42, and the remaining two pairs of opto-coupler units 70 and 80 connected between port 41 and 43 (as currently shown with the connections to port 41 being through switch 50).

What is claimed:

1. A connectivity interface for controllably providing a communication path between an end user's workstation and an external data communication network, comprising a first port arranged to be coupled to said end user's workstation and a second port arranged to be coupled to said external data network, and an opto-coupler unit coupled between said first port and said second port and being controllably operative, for a first operational mode, to provide an optical communication link between said first and second ports and, for a second operational mode, to interrupt said optical communication link between said first and second ports, and wherein said opto-coupler unit includes a power coupling port, which is coupled in circuit with a power source for said opto-coupler unit when said connectivity interface is placed in a first operational condition associated with said first mode, but is decoupled from said power source when said connectivity interface is placed in a second operational condition associated with said second mode.

2. A connectivity interface for controllably providing a communication path between an end user's workstation and an external data communication network, comprising a first port arranged to be coupled to said end user's workstation and a second port arranged to be coupled to said external data network, and an opto-coupler unit coupled between said first port and said second port and being controllably operative, for a first operational mode, to provide an optical communication link between said first and second ports, and further comprising a third port arranged to be coupled to a local network, and a controlled switch, coupled in circuit between said first port and said third port, and between said first port and said opto-coupler unit, and being operative to provide a first communication path therethrough between said first port and said opto-coupler unit for said first operational mode, and to provide a second communication path therethrough between said first port and said third port for said second operational mode.

3. A connectivity interface according to claim 2, wherein said opto-coupler unit is enabled for said first operational mode, but is disabled for said second operational mode.

4. A connectivity interface according to claim 2, wherein each of said first, second and third ports is a bidirectional communication port.

5. A connectivity interface, for controllably providing a communication path between an end user's workstation and an external data communication network, comprising a first port arranged to be coupled to said end user's workstation and a second port arranged to be coupled to said external data network, and an opto-coupler unit coupled between said first port and said second port and being controllably operative, for a first operational mode, to provide an optical communication link between said first and second ports and, for a second operational mode, to interrupt said optical communication link between said first and second ports, and further comprising a third port arranged to be coupled to a local network, and an additional opto-coupler unit coupled between said first port and said third port and being controllably operative, for said second operational mode, to provide an auxiliary optical communication link between said first and third ports and, for said first operational mode, to interrupt said auxiliary optical communication link between said first and third ports.

6. A computer connectivity interface for controllably enabling a computer end user to maintain a secure communication path between an end user's workstation and a local network, while having the ability to selectively provide a separate communication path between said end user's workstation and an external data communication network, said interface comprising a first port arranged to be coupled to said end user's workstation, a second port arranged to be coupled to said local network, and a third port arranged to be coupled to said external data communication network, an opto-coupler unit coupled between said first port and said third port and being operative, when enabled, to optically link said first and third ports, and when disabled, to sever said optical link between said first and third ports, and a controlled switch, coupled in circuit between said first port and said second port, and between said first port and said opto-coupler, and being operative to provide a first communication path therethrough between said first and second ports for a first operational condition of said controlled switch, and to provide a second communication path therethrough between said first port and said opto-coupler for a second operational condition of said controlled switch.

7. A connectivity interface according to claim 6, wherein each of said first, second and third ports is a bidirectional communication port.

8. A connectivity interface according to claim 6, wherein said opto-coupler unit is arranged to be powered up in response to said controlled switch being placed in said first operational condition, but is unpowered in response to said controlled switch being placed in said second operational condition.

9. A connectivity interface according to claim 6, wherein said opto-coupler unit includes a power coupling port which is coupled in circuit with a power source for said opto-coupler unit when said controlled switch is placed in said first operational condition, but is decoupled from said power source when said controlled switch is placed in said second operational condition.

10. A connectivity interface according to claim 6, further comprising an additional opto-coupler unit coupled between said first port and said second port and being controllably operative, for said second operational mode, to provide an auxiliary optical communication link between said first and second ports and, for said first operational mode, to interrupt said auxiliary optical communication link between said first and second ports.

11. A method, of enabling a computer and user to maintain a secure communication path between an end user's workstation and a local area network, while having the ability to selectively provide a separate communication path between said end user's workstation and an external data communication network, comprising the steps of:

(a) for a first operational mode in which said end user's workstation is to be connected with said external data communication network, providing an optical communication link therebetween; and (b) for a second operational mode in which said end user's workstation is to be disconnected from said external data communication network, severing said optical communication link, and wherein step (a) further comprises providing a multi-port switch unit having a first port arranged to be coupled to said end user's workstation, and a second port arranged to be coupled to said external data communication network, and including an opto-coupler unit coupled between said first port and said second port and, when enabled, providing said optical communication link between said first and second ports, and wherein step (b) further comprises causing said opto-coupler unit to sever said optical communication link between said first and second ports.

12. A method according to claim 11, wherein said multi-port switch further includes a controlled switch, coupled in circuit between said first port and a third port to said local area network, and between said first port and said opto-coupler, and being operative, in step (b) to provide a first communication path therethrough between said first and third ports and, in step (a) to provide a second communication path therethrough between said first port and said opto-coupler.

13. A method according to claim 12, wherein each of said first, second and third ports is a bidirectional communication port.

14. A method according to claim 12, wherein said opto-coupler unit is arranged to be powered up in step (a), but is unpowered in step (b).

15. A method according to claim 14, wherein said opto-coupler unit includes a power coupling port which is coupled in circuit with a power source for said opto-coupler unit in step (a), but is decoupled from said power source in step (b).

* * * * *